US011727514B2

(12) United States Patent
Tucker et al.

(10) Patent No.: US 11,727,514 B2
(45) Date of Patent: Aug. 15, 2023

(54) BRAND AND LICENSE HIERARCHY MANAGEMENT SYSTEM

(71) Applicant: Walmart Apollo, LLC, Bentonville, AR (US)

(72) Inventors: Benjamin Tucker, Bella Vista, AR (US); Renjith Lal Erreseril, Centerton, AR (US); Deron Gardner, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 62 days.

(21) Appl. No.: 16/408,955

(22) Filed: May 10, 2019

(65) Prior Publication Data

US 2019/0378228 A1 Dec. 12, 2019

Related U.S. Application Data

(60) Provisional application No. 62/681,606, filed on Jun. 6, 2018.

(51) Int. Cl.
*G06Q 20/00* (2012.01)
*G06Q 50/18* (2012.01)
(Continued)

(52) U.S. Cl.
CPC .......... *G06Q 50/184* (2013.01); *G06Q 20/10* (2013.01); *G06Q 30/018* (2013.01)

(58) Field of Classification Search
CPC ........ G06Q 10/06; G06Q 20/00; G06Q 20/10; G06Q 30/01; G06Q 30/02; G06Q 30/018;
(Continued)

(56) References Cited

U.S. PATENT DOCUMENTS 7,039,606 B2 5/2006 Hoffman et al.
9,659,154 B2 5/2017 Takemoto et al.
(Continued)

OTHER PUBLICATIONS

Young, Lee W., "International Search Report and Written Opinion", International Application No. PCT/US2019/031726, dated Aug. 1, 2019, 8 pages.
(Continued)

*Primary Examiner* — Jessica Lemieux
*Assistant Examiner* — Mohammed H Mustafa
(74) *Attorney, Agent, or Firm* — Barta, Jones & Foley, PLLC

(57) ABSTRACT

Systems and methods are disclosed for brand and license hierarchy management to improve brand governance. A hierarchal data structure permits tracking of products, associating items separately with brands and licenses, so that a subset of items associated with a particular brand may have differing license associations. The hierarchal structure advantageously facilitates nesting of primary and secondary (or more) brands and licenses to provide for more reliable automated royalty payment management that can reduce risks of missing payments or making unnecessary duplicate payments. A factory tracking functionality assists compliance with regulatory and ethical sourcing requirements to help reduce reputational and financial risks, for example with private brands, exclusive brands, and imported items. A user interface may be employed for management of brands and licenses, including identification of duplicate brand entries, and machine learning may be employed for associating the correct brand hierarchy to a product based on given product details.

20 Claims, 9 Drawing Sheets

(51) Int. Cl.
*G06Q 30/018* (2023.01)
*G06Q 20/10* (2012.01)

(58) Field of Classification Search
CPC ...... G06Q 50/18; G06Q 50/184; G06Q 30/06; G06Q 30/0631; G06Q 30/0635
USPC .................................................. 705/4, 35–45
See application file for complete search history.

(56) References Cited

U.S. PATENT DOCUMENTS

| | | | |
|---|---|---|---|
| 2001/0013004 A1 | 8/2001 | Haris et al. | |
| 2003/0048301 A1* | 3/2003 | Menninger | G06Q 10/06 715/764 |
| 2003/0055692 A1* | 3/2003 | Menninger | G06Q 10/06 705/7.34 |
| 2003/0055710 A1 | 3/2003 | Burk et al. | |
| 2005/0049973 A1 | 3/2005 | Read et al. | |
| 2006/0095270 A1 | 5/2006 | Somerville | |
| 2013/0173402 A1* | 7/2013 | Young | G06Q 30/0631 705/14.73 |
| 2013/0311329 A1* | 11/2013 | Knudson | G06Q 30/0639 705/26.9 |
| 2016/0027042 A1* | 1/2016 | Heeter | G06Q 30/0248 705/14.47 |
| 2017/0221080 A1 | 8/2017 | Mauro et al. | |

OTHER PUBLICATIONS

Dunes, Mathieu et al., "Practices in the brand management system: identification and considerations for five business sectors", Emeraldinsight, emeraldinsight.com/doi/abs/10.1108/JPBM-09-2013-0396, copyright 2013, pp. 1-2.

Unknown, "Flexible Hierarchies for Product Brand Management in Life Sciences", Reltio, reltio.com/blog/2016/4/flexible-hierarchies-for-product-brand-and-category-management, 2016, pp. 1-2.

* cited by examiner

BRAND AND LICENSE HIERARCHY MANAGEMENT SYSTEM

BACKGROUND

Brand and intellectual property (IP) license management presents challenges in large-scale automated retail environments that involve use of multiple suppliers placing differing brand identifications and logos on products. Different suppliers' products may trigger multiple IP license obligations, simultaneously, and if the suppliers themselves are large, they may inadvertently ship products with inconsistent versions of a brand name. For example, one product manager at a supplier may label products with the name "Company Product", whereas other product managers at the same supplier may label products slightly differently, such as "Company-Product" or "CompanyProduct"—creating difficulties for the retailer to properly track and manage its supply chain. That is, the retailer's automated systems may identify the products as different brands, rather than only just a single brand, creating a risk that the retailer may make duplicate payments or may miss some required payments.

SUMMARY

Systems and methods are disclosed for brand and license hierarchy management to improve brand governance. A hierarchal data structure permits tracking of products, associating items separately with brands and licenses, so that a subset of items associated with a particular brand may have differing license associations. The hierarchal structure advantageously facilitates nesting of primary and secondary (or more) brands and licenses to provide for more reliable automated royalty payment management that may reduce risks of missing payments or making unnecessary duplicate payments. A factory tracking functionality assists compliance with regulatory and ethical sourcing requirements to help reduce reputational and financial risks, for example with private brands, exclusive brands, and imported items. A user interface may be employed for management of brands and licenses, including identification of duplicate brand entries, and machine learning may be employed for associating the correct brand hierarchy to a product based on given product details.

Some embodiments of a system for brand and license hierarchy management may comprise: a processor; and a computer-readable medium storing a data model and first instructions that are operative when executed by the processor, the data model comprising: a hierarchical structure configured for nesting primary and secondary information, including data fields that indicate: brand or license information, and whether factory tracking is required; and the first instructions comprising logic for: providing a user interface; identifying duplicate brand entries; determining whether the factory tracking is required; responsive to determining that the factory tracking is required, determining whether the factory tracking is provided; and responsive to determining that the factory tracking is not provided, generating a corrective action.

Some methods for brand and license hierarchy management implemented on at least one processor, the method comprising: storing a data model in a computer-readable medium, the data model comprising: a hierarchical structure configured for nesting primary and secondary information, including data fields that indicate: at least one of brand or license information, and whether factory tracking is required; and executing, by the at least one processor, first instructions comprising logic for: associating a first brand with an item using the hierarchical structure; associating a second information with the item using the hierarchical structure; identifying duplicate brand entries; and responsive to identifying duplicate brand entries, generating a corrective action.

One or more exemplary computer storage devices having a first computer-executable instructions stored thereon for brand and license hierarchy management, which, on execution by a computer, cause the computer to perform operations which may comprise: storing a data model in a computer-readable medium, the data model comprising: a hierarchical structure configured for nesting primary and secondary information, including data fields that indicate: at least one of brand or license information, and whether factory tracking is required; and executing, by the at least one processor, first instructions comprising logic for: associating a first brand with an item using the hierarchical structure; associating a second information with the item using the hierarchical structure; identifying duplicate brand entries; and responsive to identifying duplicate brand entries, generating a corrective action.

A system for brand and license hierarchy management implemented on at least one processor may comprise: a processor; and a non-transitory computer-readable medium storing instructions that are operative when executed by the processor, the instructions comprising logic for implementing any of the methods or processes disclosed herein.

Alternatively, or in addition to the other examples described herein, examples include any combination of the following: generating a corrective action comprises issuing an alert or generating an automatic corrective action; the data model further comprises a data field that indicates whether an item is one selected from the list consisting of: a private brand, an exclusive brand and an import; the user interface permits user editing of the data field that indicates whether factory tracking is required; the instructions for identifying duplicate brand entries comprise instructions for identifying spelling or punctuation variations, and wherein the first instructions further comprise logic for: responsive to identifying duplicate brand entries, generating a corrective action; the first instructions further comprise logic for initiating a payment based on the data in the hierarchical structure; the second information comprises a secondary brand or a license; and the first instructions further comprise logic for generating reports on brand performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1A:
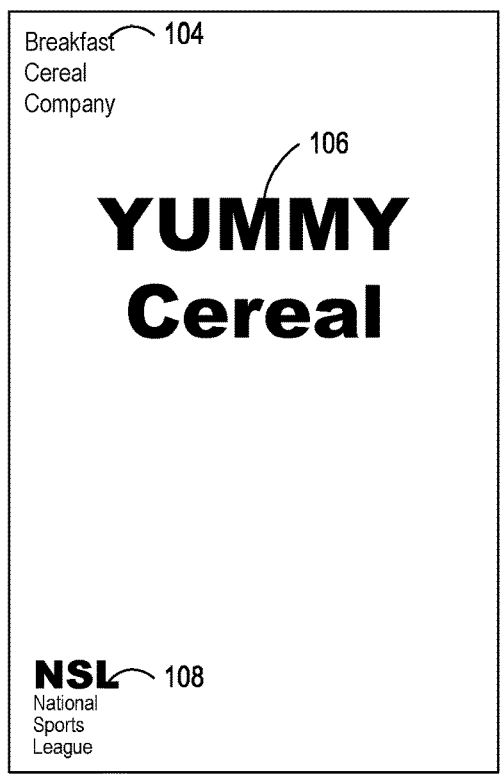
FIGS. 1A-1D illustrate item or product marking scenarios which may be used to describe some advantages of various embodiments of a brand and license hierarchy management system.

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . ." For brevity and clarity of presentation, this implied leading clause is not repeated ad nauseum.

Referring to the figures, examples of the disclosure enable systems and methods for brand and license hierarchy management to improve brand governance. A hierarchal data structure permits tracking of products, associating items separately with brands and licenses, so that a subset of items associated with a particular brand may have differing license associations. The hierarchal structure advantageously facilitates nesting of primary and secondary (or more) brands and licenses to provide for more reliable automated royalty payment management that may reduce risks of missing payments or making unnecessary duplicate payments. A factory tracking functionality assists compliance with regulatory and ethical sourcing requirements to help reduce reputational and financial risks, for example with private brands, exclusive brands, and imported items. A user interface may be employed for management of brands and licenses, including identification of duplicate brand entries, and machine learning may be employed for associating the correct brand hierarchy to a product based on given product details.

A brand management system (BMS) may be used by a company to monitor brand performance and track obligations. However, legacy brand processes are typically free-form databases or data structures with little to no means for enforcing standards. Brand data may often be entered as flat strings, which do not allow for variances or tracking and relating primary versus secondary branding hierarchies. In some scenarios, when buyers manage brands, suppliers may not have insights. In some situations, even when suppliers manage branding, different people within the supplier organization may create slightly differing version of the brand.

For example, one product manager at a supplier may label products with the name "Company Product", whereas other product managers at the same supplier may label products slightly differently, such as "Company-Product" or "CompanyProduct"—creating difficulties for the retailer to properly track and manage its supply chain. That is, the retailer's automated systems may identify the products as different brands, rather than only just a single brand, creating a risk that the retailer may make duplicate payments or may miss some required payments. Additionally, when there is a common brand that is being processed as separate brands (due to the slightly different versions that are not recognized as same brand), data that would be used to ascertain sales performance may be missed or incorrect, such as failing to properly identify a high seller because sales are spread among the different product spelling variations. With flat text-based systems, it may require a time-consuming search through database records to properly identify all potential variants of brand identifications.

Additionally, generic item descriptions incoming from a supplier (e.g., princess shirt) may not be sufficiently specific to enable a retailer to ascertain whether the product is identified as a secondary brand under a particular primary brand. Since a sale of particular item may invoke royalty payments to multiple parties, there is a risk if the obligations are not accurately and reliably tracked. Some items, for example, may require payments to the brand owner, and payments to a trademark (TM) owner, if a particular item package displays a trademarked logo. In addition to TM royalties, payment of other royalties may also be required.

For example, consider the retail sales of a complex consumer electronic device that may require not only payments to the brand owners, but also royalty payments for patent licenses or use of logos. Some suppliers may make the required royalty payments, whereas some may not. Additionally, some products may be sold under a private label, and so the manufacturers may not make the royalty payments, because the products are not sold under the manufacturer's own brand (if any). This may create a risk is that the retailer may be approached for overdue, unpaid royalty payments or sued by the intellectual property (IP) rights holders, resulting in potentially increased higher total costs in comparison with proactively paying royalties in a timely manner. If, however, the manufacturers did actually pay the required royalties, having timely and reliable access to this information (because it was properly tracked) may assist the retailer in saving the unnecessary expense of duplicate royalty payments (i.e., overpayments).

Factory identification (ID) may be required in multiple scenarios, such as to ensure ethical sourcing (ES) for retailer or brand reputation, regulatory compliance requirements for private label products and imported products, items subject to some licensing arrangements, and items with brands that are exclusive to a particular retailer (i.e., exclusive brands). Thus, there is a need for a system that can ensure that a factory ID requirement is enforced systematically for:

branded items impacted by ethical sourcing requirements;
non-branded items impacted by ethical sourcing requirements;
private label items;
items subject to licensing arrangements;
exclusive brands;
items imported by a retailer entity; and
other items.

There are typically multiple stakeholders for brand management, including legal, ES managers, product safety, compliance, and accounts payable. The legal team may require the ability to report sales and inventory throughout the company for all private label goods. ES managers may require appropriate identification of goods owned by a retailer, as well as suppliers to determine standards of factories and facilities. Product safety and compliance teams may require identification of goods owned by a retailer to report against conflict mineral audits and multiple government regulations. Accounts payable may require the identification of brands and licenses to pay royalties due to appropriate proprietors.

A hierarchal data structure and associated methods for use may be advantageously employed to assign brands and licenses to accurately track products, and may further include a user interface to manage the brand and license hierarchy as well as a machine learning component for associating the correct brand hierarchy to a product based on given product details. Thus, a tool is available for suppliers to manage brands with merchants or retailers, and a workflow may be managed to mitigate duplicate brand entries, such as brand variation entries that currently fall through the cracks. Embodiments of the tool may manage primary versus secondary branding, licensing extensions, private labels, exclusive brands, imported items, and also ES and compliance requirements for factory ID tracking. Some embodiments of a brand and license hierarchy management system may connect items and brands to a factory ID allowing critical report generation for merchandising and sourcing decisions.

There are multiple advantages provided by such a tool, including forecasting and financial reporting improvements by having a consistent manner of managing supplier brand across channels. Compliance may be facilitated by reducing fines, expenses, and potential legal issues. Identifying private brands and private labels may enable automatic tracking and association with contract details for simplifying royalty payments, while improving accuracy. Product brand, sales and marketing teams can gain access to product information when it is exported and synchronized with downstream systems. They can also manage and access information through data-driven applications presenting relevant information and views specifically targeted to their business needs. User dashboards with visual navigation may provide customized analysis across multiple differing sets of data dimensions, and may also be set up to detect new or updated data from sources. Various stakeholders may be proactively notified of new or significantly changed data, rather than requiring users to search or query data for important changes.

Suppliers may manage brands during a periodic review or during the on-boarding process of a new supplier/retailer relationship. For example, when a supplier is on-boarded, the contract may be set up, and the supplier uses a brand and license hierarchy management system tool to set up their own brands with an internal governance and review provided by the system for approval of the new submission. Once a brand is set up, the supplier can then set up each of their items in the system. A batch review or merge process may detect and flag to the user (or possibly auto-correct) brand duplicates in system. In some embodiments, a centrally stored database may be used to manage geographically-dispersed organizations.

FIGS. 1A-1D illustrate item marking scenarios for which some advantages of various embodiments of a brand and license hierarchy management system may be described. FIG. 1A shows an item with a package 102 that displays a primary brand 104, a secondary brand 106, and a primary license item 108. That is, FIG. 1A shows an exemplary breakfast cereal box package 102 displaying "Breakfast Cereal Company" as primary brand 104, "YUMMY Cereal" as secondary brand 106, and a "NSL National Sports League" logo as primary license item 108. A primary brand is an umbrella brand for a class of items that may have multiple differently-named specific brands. For example, the primary Breakfast Cereal Company may have multiple secondary brands, such as YUMMY Cereal, HIGH FIBER Cereal, LOW CALORIE Cereal, and each package will typically display both the primary brand and the secondary brand, with the secondary brand perhaps displayed more prominently.

In addition to the brand displays, package 102 also displays a logo as a primary license item 108 that may require the retailer to pay a license royalty to an entity other than the supplier of the product. That is, a royalty may be due to the owner of the NSL mark, beyond what the retailer had paid to Breakfast Cereal Company for the product, if Breakfast Cereal Company had not already paid the royalty. There is utility in the retailer accurately tracking whether this royalty had been paid when the product is sold. If the retailer owed the amount, but did not pay, there may be additional expenses, whereas if the supplier had paid, then the retailer may be wasting money on duplicate payments.

Figure 1B:
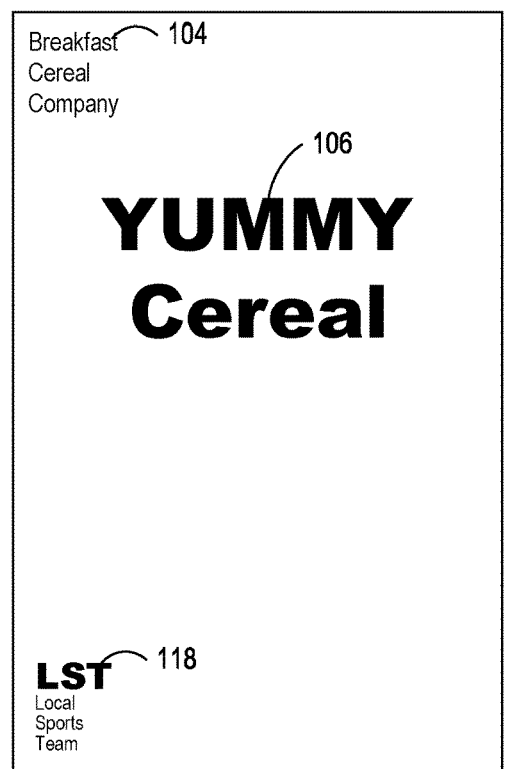
Figure 1C:

This situation of an item having both brand displays and an additional license item displayed can arise in certain marketing campaigns, such as the brand owner promoting a product with an implied partnership or endorsement of an entity that licenses out use of its logos. Similar to the way that brands may be hierarchical, with a primary brand, and a secondary brand (and maybe even levels below that), license items may also be hierarchical. For example, the primary license item could be a national league, such as the displayed NSL, whereas a particular team, associated with a city, may be a secondary license item. For example, in FIG. 1B, package 110 displays a secondary license item 118 as "Local Sports Team." In some examples, am item may display a license item prominently, rather than a brand, such as is illustrated in FIG. 1C with a t-shirt product 120 displaying only secondary license item 118.

Figure 1D:
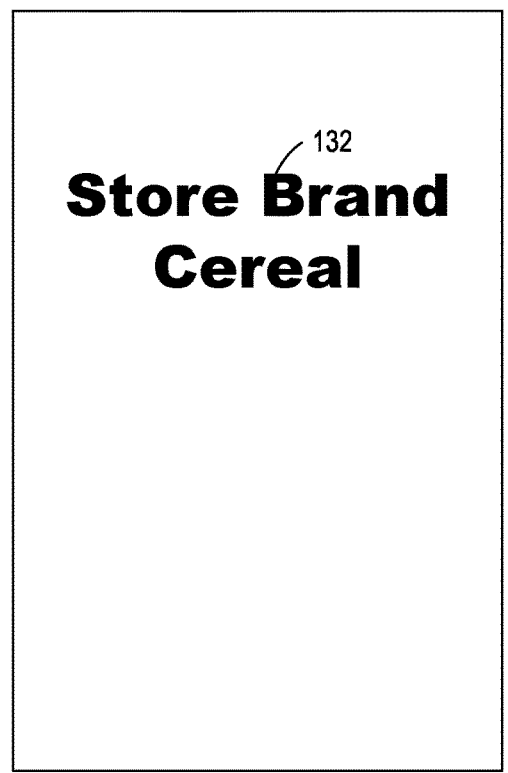

Another example is illustrated in FIG. 1D, in which a cereal box 130 displays a private brand 132 as "Store Brand Cereal." Each of these item marking scenarios has its own requirements that require differing management and accounting practices. For a large organization with highly automated systems, tracking the requirements for these different items may present challenges, without the proper tools. For example, the accounts payable department may require the identification of brand and license items to pay royalties due to the appropriate intellectual property (IP) rights holders. As an additional example, private label products may be subject to a regulatory requirement to track the factory of origin. In some embodiments, the tracking should be with the item, rather than the brand, because different items sold under the under same brand label may originate in different factories, and also different items sold under the under same brand label may have different additional license item arrangements (such as different sports league or specific team logos, or none at all). In general, brands and logos and license obligations are separate IP objects; licenses could be for more than just trademarked items, and may possibly include copyrighted material and patents.

Figure 2A:
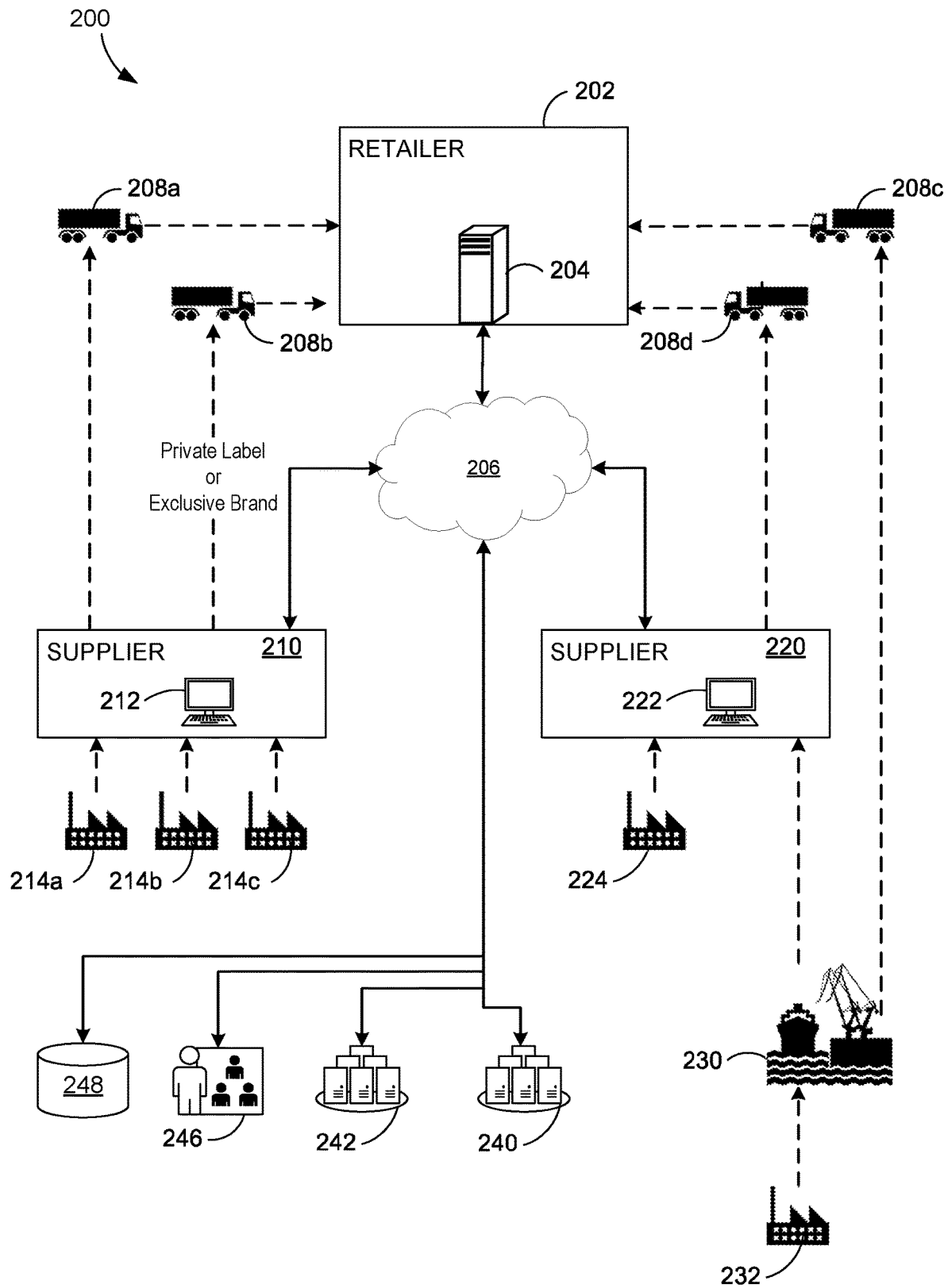
FIG. 2A illustrates an exemplary environment that advantageously employs an example of a brand and license hierarchy management system.

FIG. 2A illustrates an exemplary environment 200 for some embodiments of a brand and license hierarchy management system. In FIG. 2A, solid lines indicate data flow and dashed lines indicate flow of goods. A retailer 202 intakes goods through various supply routes, 208a-208d, as illustrated. A first supplier 210 receives goods from three factories 214a-214c and then sends the goods to retailer 202 via routes 208a and 208b. As illustrated, some of the products, sent via route 208b, are private label products or exclusive brand products. These will therefore require that the factory of origin, such as one of factories 214a-214c, be tracked and stored for compliance purposes.

Retailer 202 also directly imports some products via an import point 230 from factory 232, using route 208c. The factory of origin, factory 232, may need to be tracked for those goods. In addition to possible government-imposed tracking requirements, ES managers may require appropriate identification of goods owned by retailer 202, as well as local suppliers, to determine whether the factories and facilities meet the threshold ES standards. Additionally, source tracking may be required for reporting for conflict mineral audits. With the illustrated system, if an item arrives through routes 208b or 208c with the factory ID missing an error may be issued.

A second supplier 220 also receives goods via import point 230 from factory 232, and uses route 208d to send the goods to retailer 202. Because supplier 220 may be required to track the factory of origin, or because of some alternative reasons, tracking the factory of origin may not be required for goods received route 208d, even though the goods also originate at factory 232 (which is tracked for goods received via route 208c). It should be understood that the different routes are shown for illustrative purposes only, and that physical goods may be shipped in a myriad of different manners, including combining goods from multiple origins and suppliers into a single shipment. It should also be understood that the illustrated retailer need not be a single location or facility, but may instead represent a set of globally-dispersed locations.

Also illustrated in FIG. 2A is an exemplary embodiment of a multi-node system for brand and license hierarchy management. As shown, Retailer 202 has a computing node 204 that may run software and store, input, and output data in various forms to facilitate the management functions. It should be understood, that although a single computing node 204 is illustrated, there may be multiple ones of computing node 204 at various facilities of retailer 202. Computing node 204 communicates across a network 206, which may include public networks, such as the internet, private networks, and point-to-point dedicated connectivity. Computing node 204 may use a data store 240 to keep a database available for remote users, such as geographically-dispersed locations of retailer 202 facilities and also suppliers 210 and 220 to input data via their own terminals 212 and 222, respectively.

Computing node 204 may perform the processing for brand and license hierarchy management locally, or may instead use a cloud resource manager 242 to perform some, most, or all of the processing. Cloud resource manager 242 and data store 240 may be separate or combined under a single service provider. Additionally, computing node 204 may communicate with IP rights owners 246, to arrange for royalty payments, or this task may be at least partially offloaded to cloud resource manager 242. Further, computing node 204 may need to search other data sources 248 in support of some functionality (as described in relation to FIG. 4).

Figure 2B:
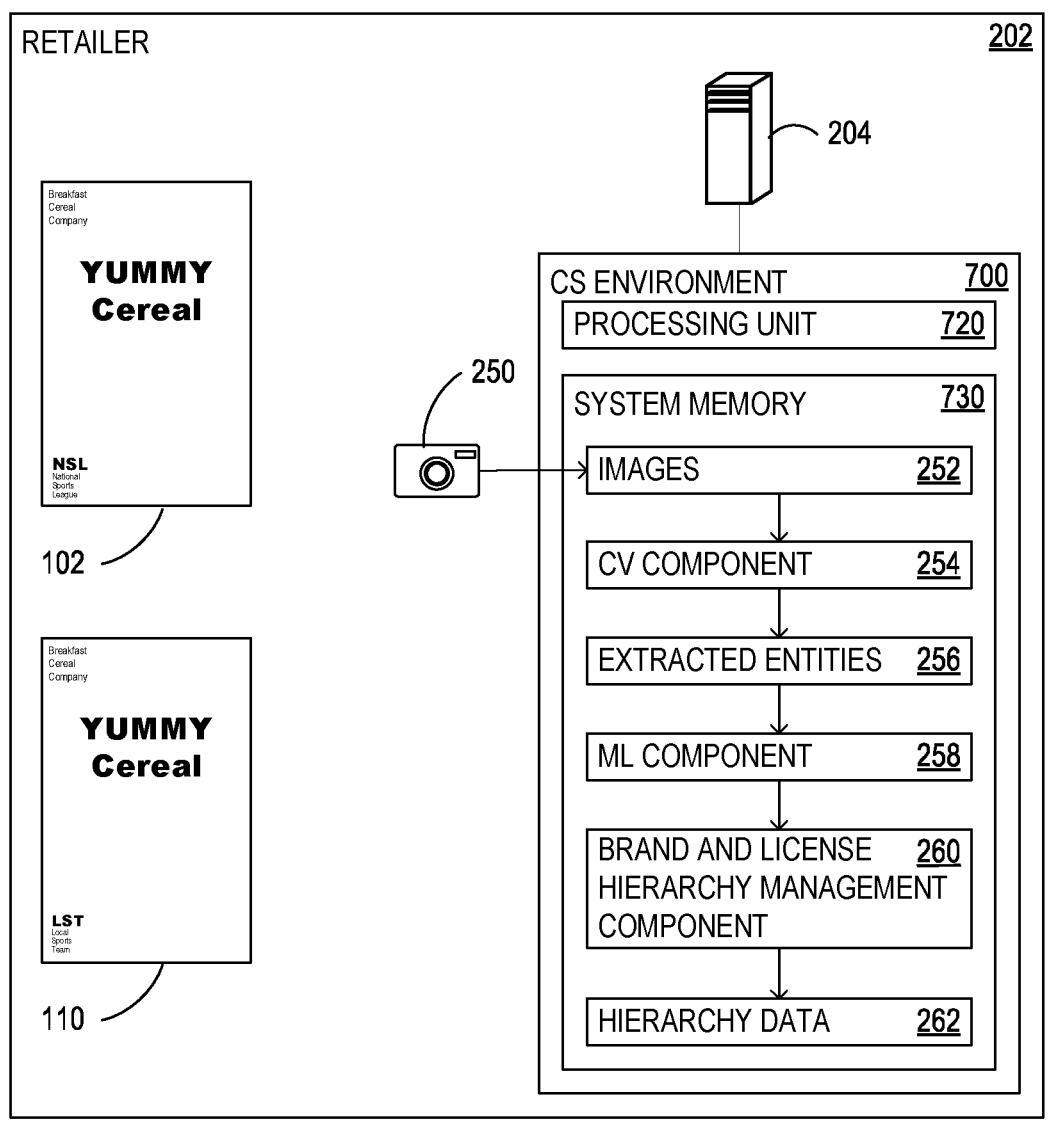
FIG. 2B illustrates additional detail for the environment of FIG. 2A.
Figure 7:
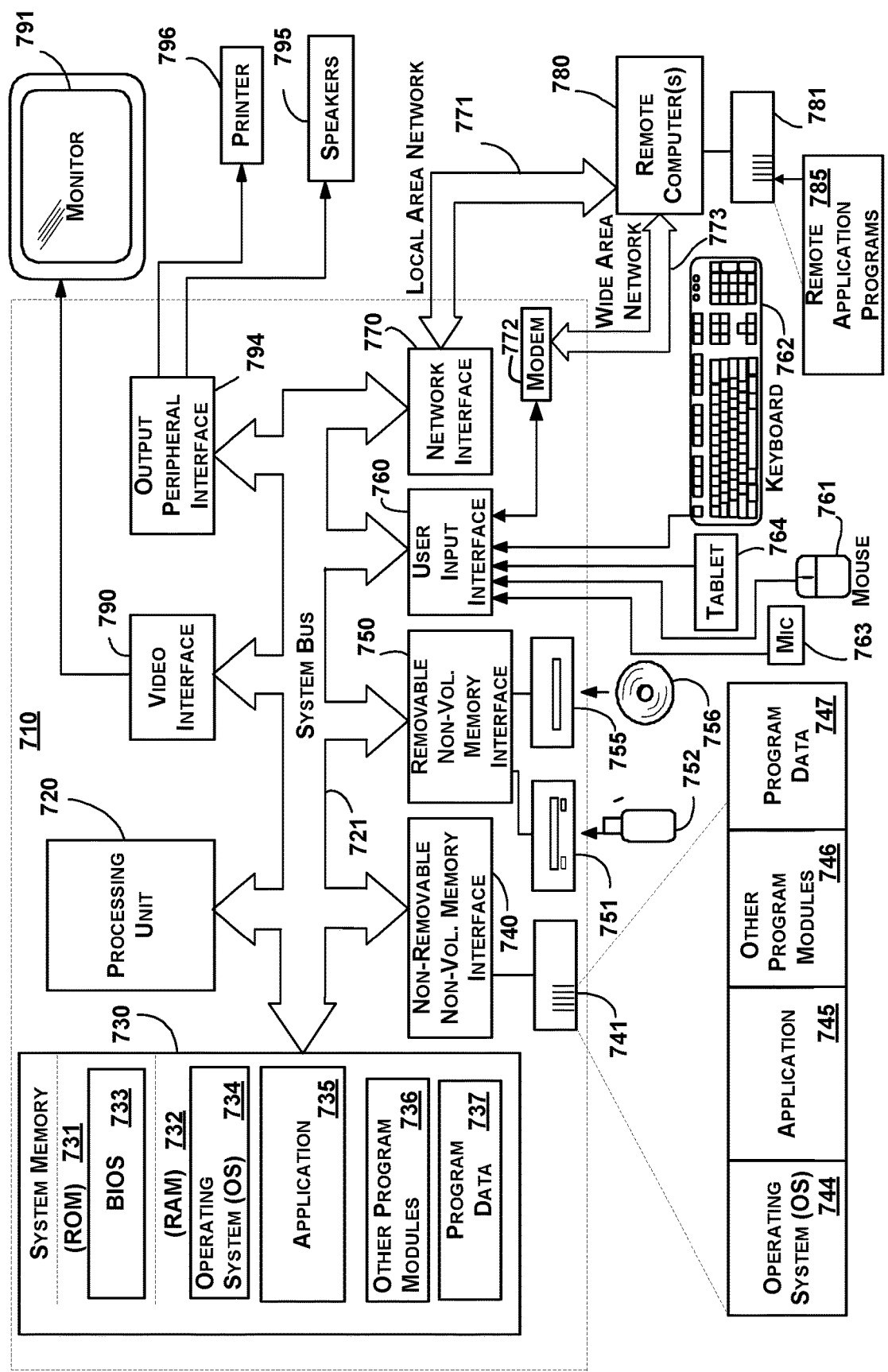
FIG. 7 is an exemplary block diagram illustrating an operating environment for a computing device implementing brand and license management operations.

FIG. 2B illustrates additional detail for environment 200 of FIG. 2A. A computing system environment 700, which is described in further detail in relation to FIG. 7, is coupled to an optical sensor 250. Optical sensor 250 is operable to collect images of packages 102 and 110, which are stored as images 252 within a system memory 730 of computing system environment 700. Also within system memory 730 of computing system environment 700 are a computer vision (CV) component 254, a machine learning (ML) component 258 (also known as an artificial intelligence (AI) component), and a brand and license hierarchy management (BLHM) component 260. CV component 254 ingests images 252 to extract image entities, such as logos and text that are associated with specific brands, and store them as extracted entities 256. ML component 258 works BLHM component 260 on extracted entities 256 to identify primary and secondary brands and also licensed items. Extracted brand data is sent to computing node 204 for storage, such as in data store 240 (of FIG. 2A). Additionally, hierarchical data (and other brand and license data) identified by ML component 258 and/or BLHM component 260 is stored in hierarchy data 262 for forwarding to computing node 204. In some examples, hierarchy data 262 is used to construct or enhance an exemplary hierarchal data structure 300, described in FIGS. 3A and 3B.

Figure 3A:
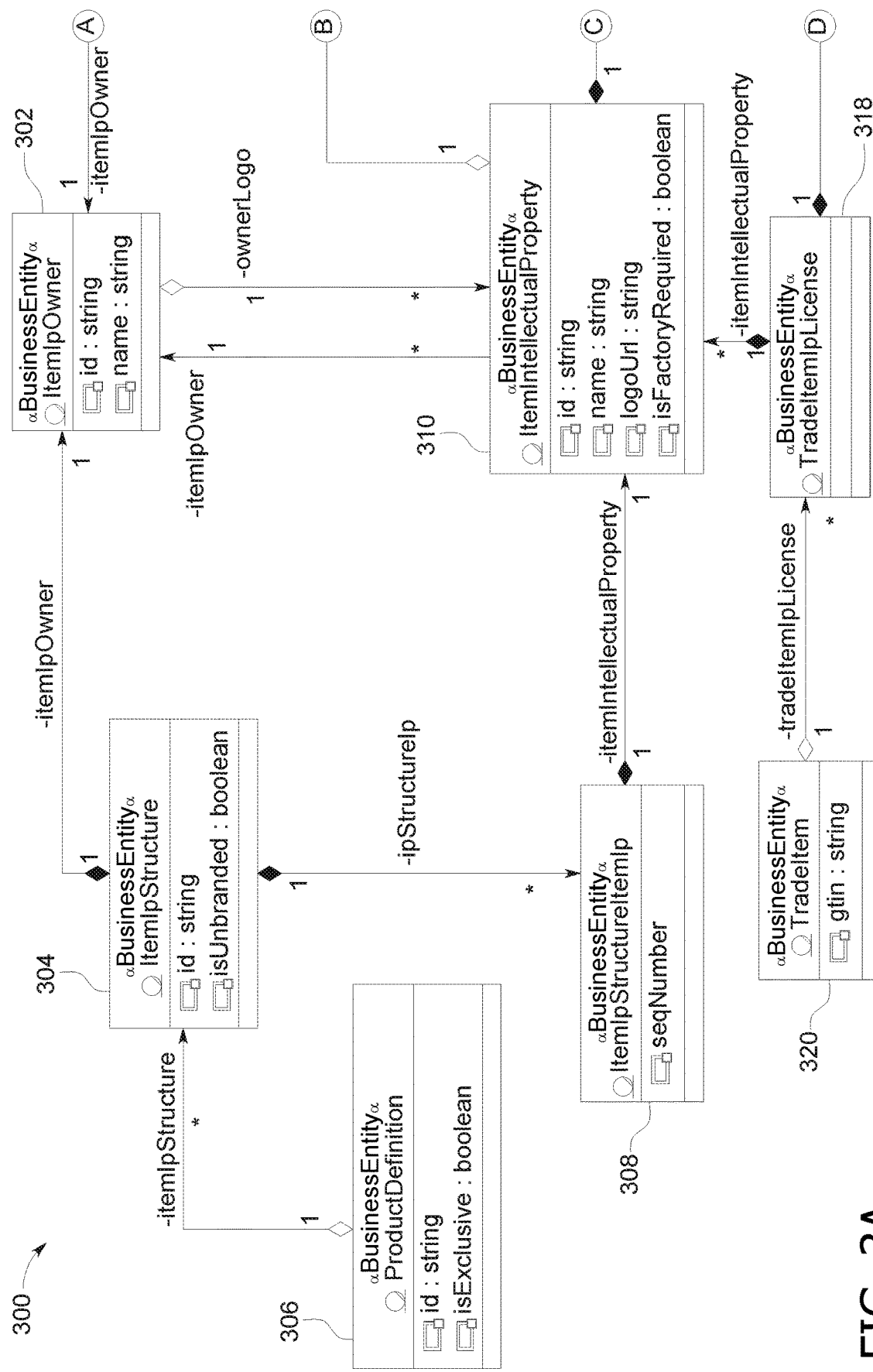
FIGS. 3A and 3B together form a diagram of an exemplary hierarchal data structure that may be used in some embodiments of a brand and license hierarchy management system.
Figure 3B:
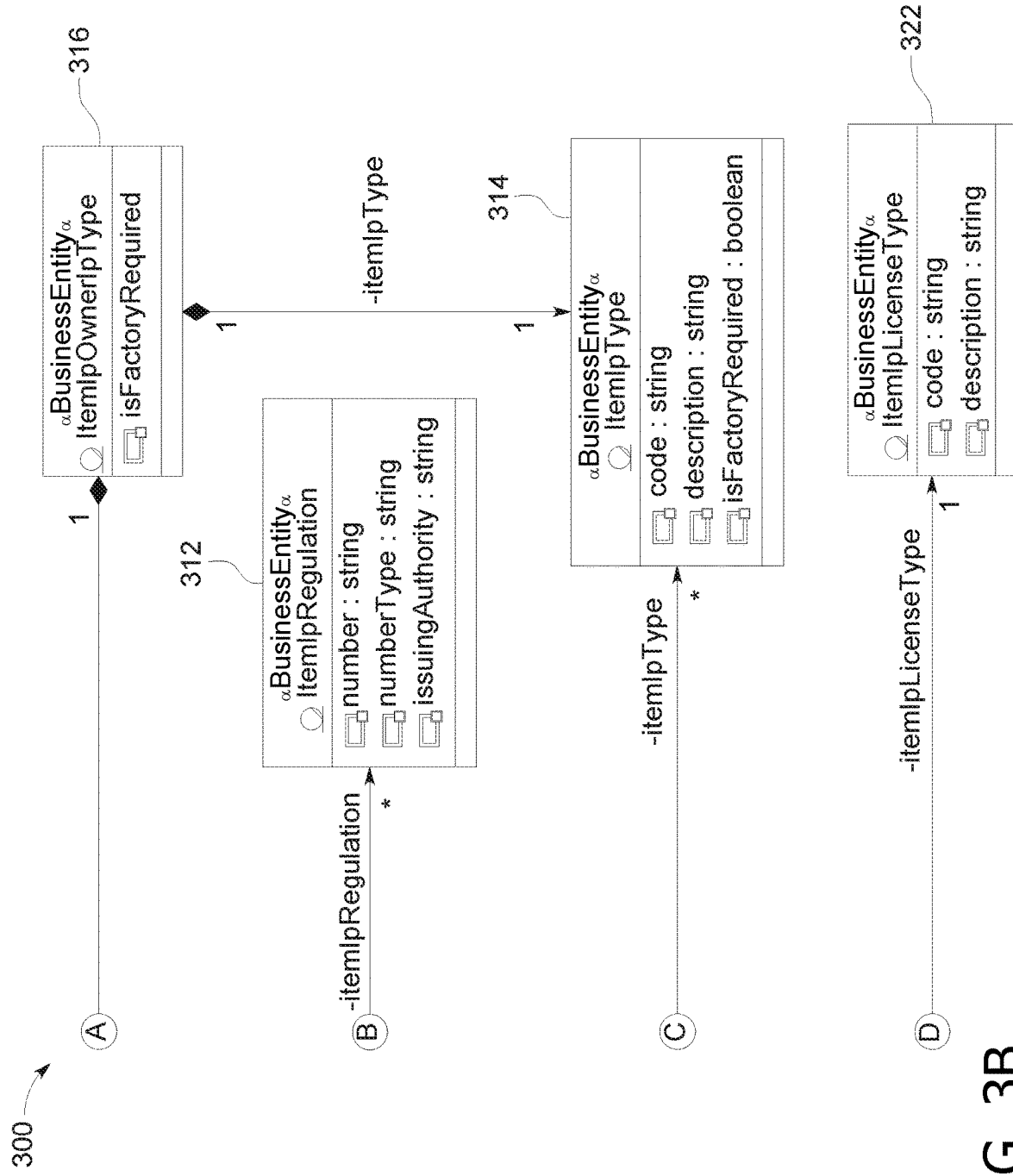

FIGS. 3A and 3B together form a diagram of an exemplary hierarchal data structure 300 that may be used in some embodiments of a brand and license hierarchy management system. FIGS. 3A and 3B should be viewed as a single diagram (hereinafter, the combination is "FIG. 3"). The data structure diagram (DSD) of FIG. 3 is an entity relation diagram (ERD) data model. At the top is an ItemIpOwner box 302 having attributes ID and name. An ItemIpStructure box 304, having the string attribute ID and also a Boolean attribute isUnbranded. As indicated data flows from box 304 to box 302. A ProductDefinition box 306 has the string attribute id and also a Boolean attribute isExclusive, which will be set to true if the item is a brand that is sold only at that specific retailer. Note that an exclusive brand may be different than a private brand. As indicated, box 306 is populated with data and then passes data to box 304. An ItemIpStructureItmIp box 308 receives data from box 304 and has an attribute seqNumber. Box 308 passes data to an ItemIntellectualProperty box 310, which has the string entity id, and other string entities name and logoUrl. Box 310 further has a boolean attribute isFactoryRequired, which indicates whether tracking of the factory ID is required for the item identified by the id string. If isFactoryRequired is set to true, and factory ID data is missing, then the system will flag an alert to alert users that important data is needed.

Box 310 passes data back and forth with box 302, and also sends data to an ItemIPRegulation box 312. Box 312 has string attributes number, numberType and numberAuthority, to permit identification of regulatory information for the item. Box 310 additionally passes information to an ItemIpType box 314, which has string attributes code and description, and the Boolean attribute isFactoryRequired. Box 314 receives data from an ItemIpOwnerType box 316, that has the isFactoryRequired attribute, and also sends data to box 302. Box 310 additionally receives from a TradeItemIpLicense box 318, which, in turn, receives data from a TradeItem box 320, having a string attribute gtin. Box 318 receives data from an ItemIpLicenseType box 320, having string attributes code and description, and also sends data to a BusinessEntity box 322.

Data structure 300 thus provides a building block for a hierarchal structure to assign brands and licenses to accurately track products, which can be used with a machine learning component for accurately associating the correct brand hierarchy to a product, based on given product details. In this manner, data structure 300 provides a component for some embodiments of a brand and license hierarchy management system. In some embodiments, a hierarchical, nested IP structure may be used as a data model. Brands or licenses or logos can be stored in an object model with a cyclical hierarchical structure.

In some embodiments, each brand is stored as an IP entity, and the arrangement can house any of the IP types, such as, without limitation, brand, license, logo, trademark, copyright, and so on, in one object model. The hierarchical nested IP structure allows tracking of primary and secondary brands and licenses. Licenses may be associated with items separately or independently from brands, but can be stored in the same structure, and may also be nested for tracking primary and secondary. For example, for a single IP entity or object that is tied to an item, a secondary brand may also be tied to that item, and a license (either primary or secondary) may be further tied to that same item. See now FIGS. 1A and 1B, showing a primary brand, a secondary brand, and a logo license, which are tied to the items (packages 102 and 110), rather than the primary brand 104. In general, brands and logos and license obligations are separate IP objects; licenses could be for more than just trademarked items, and may possibly include copyrighted material and patents. This permits setting a required royalty indicator on the items. Identifying vendor numbers, as royalty vendors, will allow accounts payable to easily identify vendors requiring royalties.

The isFactoryRequired attribute facilitates compliance with regulatory and ES requirements to track products back to the factory of origin. The factory will be tracked by item, rather than the brand, since different items labeled with the same brand may originate in different factories. In some scenarios, such as private brands and exclusive brands, the brand itself triggers isFactoryRequired to be true. In other scenarios, other information, such as whether the item is directly imported by the retailer or else is sourced from a domestic supplier, acts as the trigger for whether isFactoryRequired to be true. Whether an item has a factory tracking requirement may be set during an item setup, material change, or audit. In any case, having this advantageous information within a brand and license hierarchy management system permits automatically issuing an alert in the event that factory identification is missing when isFactoryRequired is set to true.

A set up process tool may require a factory ID for all import items and permit the ability to set up a factory ID for domestic items (based on ES needs or other regulatory requirements) and also add non-private label factory ID selections for national branded items. The factory ID required settings may thus be automated, or may use local supplier flags from vendor agreements. A universal product code (UPC) level data audit tool can check brand and private label information from the item level to compare with other items having the same UPC to check for errors and inconsistencies. This hierarchical arrangement provides that ability to query brands and licensed goods and generate reports at multiple levels. Better governance is thus available by providing the ability to generate new items and brands with standards applied. For example, purchase orders can be automatically screened to ensure compliance with the factory ID requirement, if needed.

Figure 4:
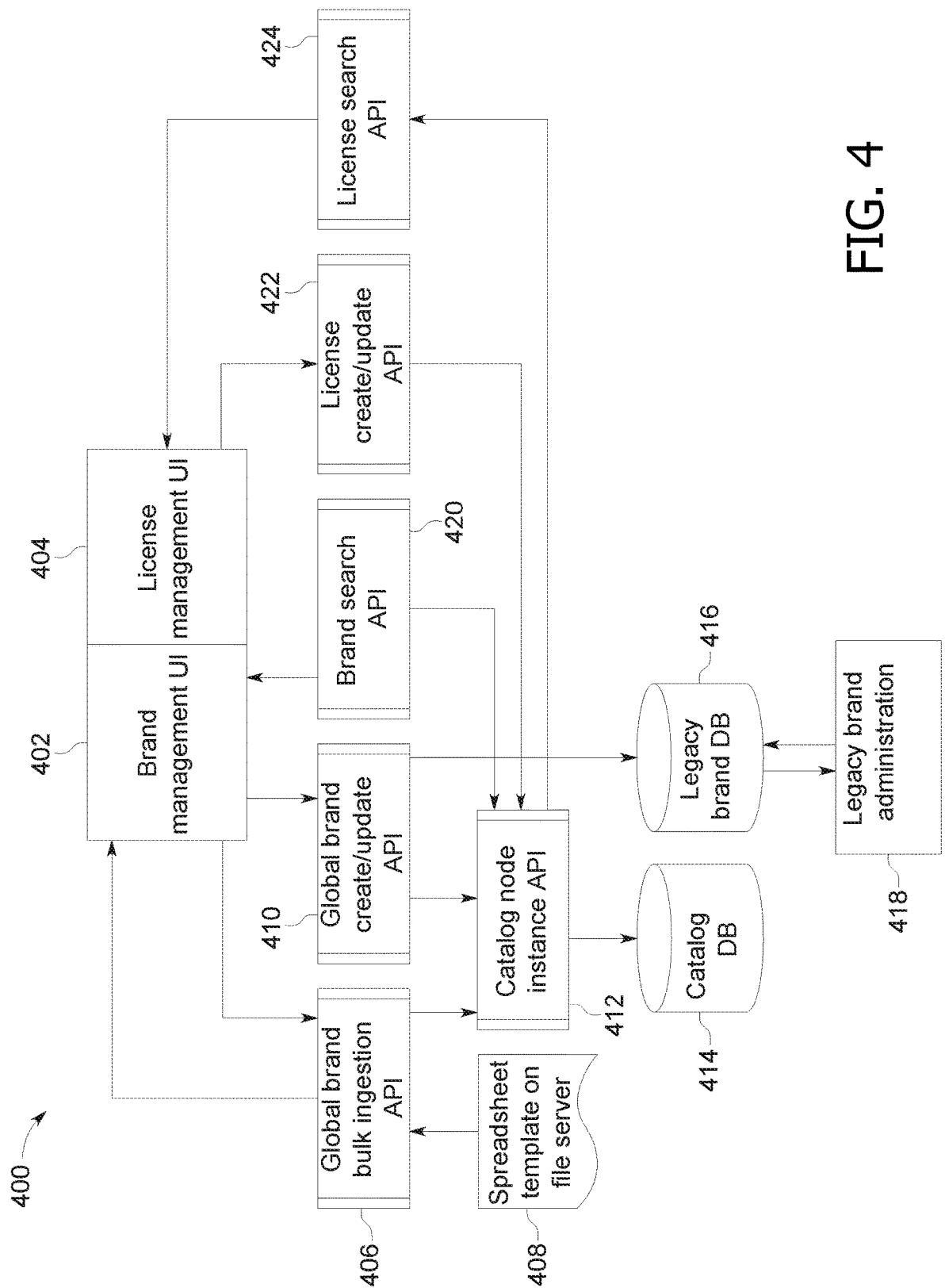
FIG. 4 is a diagram of an exemplary data flow, as may be used in some embodiments.

FIG. 4 is a diagram of an exemplary data flow 400, as may be used in some embodiments. A Brand Management user interface (UI) 402 and a License Management UI 404 are provided. These may be used, for example, when a supplier is on-boarded and sets up their brands, using for example terminals 212 and 222 of FIG. 2A. Brand Management UI 402 and License Management UI 404 may run on any of terminal 212, terminal 222, computing node 204, cloud resource manager 242, or some other node. Brand Management UI 402 interfaces with a Global Brand Bulk Ingestion API 406 to ingest item and brand data in automated processes, possibly involving large data sets. A Spreadsheet Template 408 is used for data formatting. Brand Management UI 402 may also initiate a Global Brand Create/Update API 410 when a user wished to enter brand or item data as a specific event.

Both Global Brand Create/Update API 410 and Global Brand Bulk Ingestion API 406 interact with a Catalog Node Instance API 412, which uses a Catalog database 414 for data storage. Global Brand Create/Update API 410 also uses a Legacy Brand database 416 which is also used by a Legacy Brand Administration 418. A Brand Search API 420 interacts with both Brand Management UI 402 and Catalog Node Instance API 412, to permit users to search for brand information. For licenses, a License Management UI 404 can be used to trigger a License Create/Update API 422, which interacts with Catalog Node Instance API 412. Catalog Node Instance API 412 also interacts with a License Search API 424, which then forwards data to License Management UI 404.

With reference to FIG. 2A, the data flow 400 APIs described here, 406, 410, 412, 420, 422, and 4234 may run on any of terminal 212, terminal 222, computing node 204, cloud resource manager 242, or some other node. Databases described here, 414 and 416, may be stored on any of computing node 204, data store 240, or another node. In general, data input by the supplier (or alternatively the retailer) may be stored on any of computing node 204, data store 240, or another node. Data searches described may be conducted in computing node 204, data store 240, IP rights owners 246, other data sources 248, or another node.

Data flow 400 may be utilized during initial item set-up, during a data audit, or otherwise, as needed. When an item is created, it may be associated with a brand, and then a secondary brand may be added, if necessary. The isFactoryRequired Boolean value may be set (either automatically or manually), and the factory identified. If the supplier is entering the data, it is then transmitted to the retailer. At this point, the retailer can examine the item data to ascertain whether all of the data fields have been properly populated. If not, the primary brand, secondary brand (and more, if necessary), primary license, and secondary license (and more, if necessary) can be added, whichever are needed. Factory tracking information can be verified and added, if necessary, and compliance information can be set. (See box 312 of FIG. 3.) An item data audit or review can detect issues, such as identifying duplicate brand entries or missing information. In some scenarios, the data may be corrected automatically (such as by merging or replacing with known good data) or an alert may be issued to flag a user attention for correction.

Figure 5:
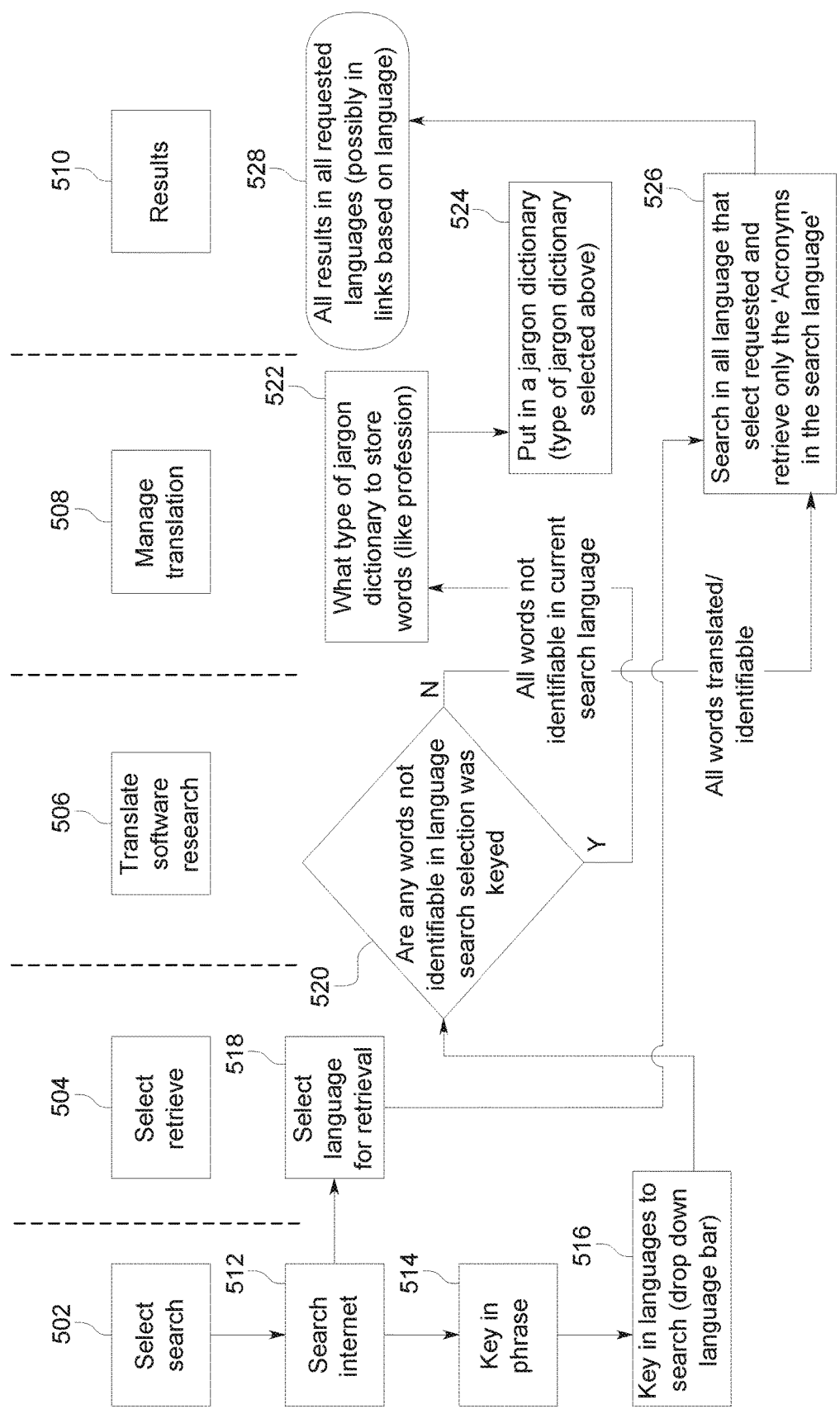
FIG. 5 is a diagram of an exemplary process flow for using some embodiments with different languages.

FIG. 5 is a diagram of an exemplary process flow 500 for using some embodiments with different languages. FIG. 5 illustrates a broader applicability of some embodiments of a brand and license hierarchy management system, for example when a translation for a brand across multiple languages is needed or desired so that the meaning of the brand is not lost for other markets with different languages. As illustrated, process flow 500 has multiple phases: A select search phase 502, a select retrieval language phase 504, a translate software research phase 506, a manage translation phase 508, and a results presentation phase 510. In select search phase 502, a user searches the internet in operation 512, possibly by keying in a phrase in operation 514, and selecting a language in operation 516. From operation 516, a decision operation 520 determines whether any words were not identifiable in the language used to key in a search selection. For a positive result in decision operation 520, process flow 500 moves into manage translation phase 508, in which a jargon dictionary is selected for store words is used, in operation 522. The words are stored in the dictionary using operation 524.

Alternatively, operation 512 may go directly to a language selection operation 518 that can select multiple languages and then moves into manage translation phase 508 to search in all languages selected (in operation 518) using operation 526. A negative result in decision operation 520 also moves into operation 526. Operation 526 searches in all of the languages that had been requested in operation 518 and retrieves results for acronyms in the selected search languages. The results in all requested languages are then provided in operation 528, as part of results presentation phase 510.

Figure 6:
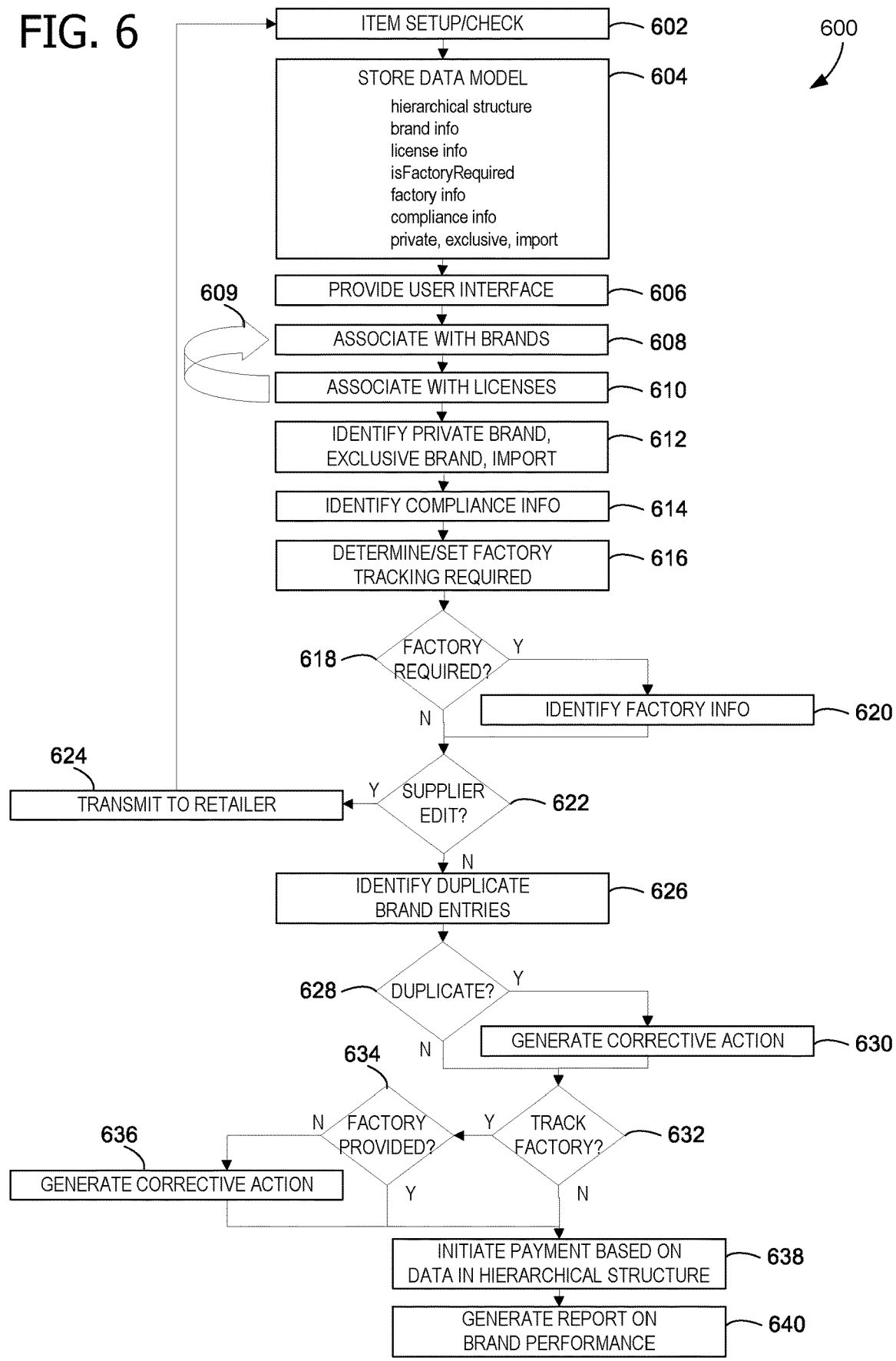
FIG. 6 is an exemplary flow chart illustrating a method that may be used in some embodiments of a brand and license hierarchy management system.

FIG. 6 is an exemplary flow chart illustrating a process 600 that may be used in some embodiments of a brand and license hierarchy management system. In some examples, process 600 begins with an item setup/check at operation 602. The setup operation may be initiated when a new supplier is on-boarded or any supplier adds a new product. Additionally, the setup operation may be performed if a supplier or retailer needs to bring its catalog into the brand and license hierarchy management system. A supplier or retailer may check an item at any time for a myriad of reasons, such as performing a periodic audit. Operation 604 stores a data model (see FIG. 3), which is a hierarchical structure that supports nesting for primary and secondary information, including data fields that indicate brand information, license information, whether factory tracking is required (and if so, the factory information), compliance information, and whether an item is a private brand, exclusive brand or imported. A user interface is provided in operation 606, so that a user can associate an item with brands (primary and/or secondary and/or further) in operation 608. A user can also associate an item with licenses (primary and/or secondary and/or further) and/or logos, patents or copyrights in operation 610.

When an item is being set up (or edited), it is possible to associate multiple hierarchies of information with the item, as indicated with recursion loop arrow 609. For example, a first instance of the hierarchal data structure 300 may be created to associate a primary brand with the item in operation 608, and a second instance of the hierarchal data structure 300 may be created to associate a secondary brand with the item in a subsequent iteration of operation 608. Additionally, another instance of the hierarchal data structure 300 may be created to associate a primary license with the item in operation 608, and yet another instance of the hierarchal data structure 300 may be created to associate a secondary license with the item in a subsequent iteration of operation 608. Operations 608 and 610 may be iterated for even further brands and licenses, as many as are needed. The set of nested data structures 300 is a hierarchical structure. It should be understood that the order of associating brands and licenses may be varied.

Whether an item is a private brand, an exclusive brand and/or an import is identified in operation 612, and compliance information, if any is identified in operation 614. This may include regulatory requirements or ES. It should be understood that, in some embodiments, operations 612 and 614 may be repeated for each instance of hierarchal data structure 300 that was created in operations 608 and 610. Whether factory tracking is required is determined or set in operation 616, possibly using regulatory requirements or ES information or whether an item is a private brand, an exclusive brand or an import. In some embodiments, the factory requirement may be set automatically, based on the known conditions thus described, whereas in some embodiments, a user may edit the information using the provided interface. Decision operation 618 determines whether factory tracking is required, and if yes, then factory information is identified in operation 620.

Up through this point, either a supplier or retailer may have been using process 600. If a supplier had been entering or editing the data, as determined in decision operation 622, then the data is transmitted to the retailer in operation 624 (e.g., to data store 240 of FIG. 2A). Starting with identifying duplicate entries in operation 626, process 600 begins verifying that needed information is in place and is accurate. Operation 626 may include identify spelling or punctuation variations, such as "Company Product", "Company-Product" or "CompanyProduct." Responsive to identifying duplicate brand entries in operation 628, operation 630 generates a corrective action. A corrective action may include an automatic correction, such as merging similar brands, and/or issuing an alert to flag a human user's attention to the need for a correction.

In decision operation 632, a determination is made whether factory tracking is required. This determination may be accomplished similarly as in decision operation 618, but the purpose of decision operation 632 is for error detection, rather than setup. So, if factory tracking is required, operation 634 ascertains whether factory tracking data is provided, such as by locating it. If the factory data is not located, then operation 636 generates a corrective action. The corrective action may be automatic correction, if feasible and reliable, or operation 636 may issue an alert for a human to make the correction.

Some of the other advantages of the brand and license hierarchy management system may be manifest in business use cases when operation 638 automatically initiates a royalty payment based on the data in the hierarchical data structure (saving labor in the retailer's accounts payable department), and operation 640 generates a report on brand performance that may be useful in assisting with marketing efforts.

In some examples, the operations illustrated in FIG. 6 may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements. While the aspects of the disclosure have been described in terms of various examples with their associated operations, a person skilled in the art would appreciate that a combination of operations from any number of different examples or some reordering is also within scope of the aspects of the disclosure.

Exemplary Operating Environment

FIG. 7 is an exemplary block diagram illustrating a computing system environment 700 implementing brand and license management. The computing system environment 700 is only one example of a suitable computing environment and is not intended to suggest any limitation as to the scope of use or functionality of the disclosure. Neither should the computing system environment 700 be interpreted as having any dependency or requirement relating to any one or combination of components illustrated in the exemplary computing system environment 700.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 7, an exemplary system for implementing various aspects of the disclosure may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Memory 731 and 732 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 710. Computer storage media does not, however, include propagated signals. Rather, computer storage media excludes propagated signals. Any such computer storage media may be part of computer 710.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735 (such as any or all of CV component 254, ML component 258, and MAIM component 260 of FIG. 2B), other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a universal serial bus (USB) port 751 that provides for reads from or writes to a removable, nonvolatile memory 752, and an optical disk drive 755 that reads from or writes to a removable, nonvolatile optical disk 756 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and USB port 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, optimization environment 745, other program modules 746 and program data 747. Note that these components may either be the same as or different from operating system 734, optimization environment 735, other program modules 736, and program data 737. Operating system 744, optimization environment 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel may be physically coupled to a housing in which the computing device (computer) 710 is incorporated, such as in a tablet-type personal computer. In addition, computers such as the computer 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

Exemplary Operating Methods and Systems

An exemplary system for brand and license hierarchy management may comprise: a processor; and a computer-readable medium storing a data model and first instructions that are operative when executed by the processor, the data model comprising: a hierarchical structure configured for nesting primary and secondary information, including data fields that indicate: brand or license information, and whether factory tracking is required; and the first instructions comprising logic for: providing a user interface; identifying duplicate brand entries; determining whether the factory tracking is required; responsive to determining that the factory tracking is required, determining whether the factory tracking is provided; and responsive to determining that the factory tracking is not provided, generating a corrective action.

An exemplary method for brand and license hierarchy management implemented on at least one processor, the method comprising: storing a data model in a computer-readable medium, the data model comprising: a hierarchical structure configured for nesting primary and secondary information, including data fields that indicate: at least one of brand or license information, and whether factory tracking is required; and executing, by the at least one processor, first instructions comprising logic for: associating a first brand with an item using the hierarchical structure; associating a second information with the item using the hierarchical structure; identifying duplicate brand entries; and responsive to identifying duplicate brand entries, generating a corrective action.

One or more exemplary computer storage devices having a first computer-executable instructions stored thereon for brand and license hierarchy management, which, on execution by a computer, cause the computer to perform operations which may comprise: storing a data model in a computer-readable medium, the data model comprising: a hierarchical structure configured for nesting primary and secondary information, including data fields that indicate: at least one of brand or license information, and whether factory tracking is required; and executing, by at least one processor, first instructions comprising logic for: associating a first brand with an item using the hierarchical structure; associating a second information with the item using the hierarchical structure; identifying duplicate brand entries; and responsive to identifying duplicate brand entries, generating a corrective action.

An exemplary for brand and license hierarchy management implemented on at least one processor may comprise: a processor; and a non-transitory computer-readable medium storing instructions that are operative when executed by the processor, the instructions comprising logic for implementing any of the methods or processes disclosed herein.

Alternatively, or in addition to the other examples described herein, examples include any combination of the following:

- generating a corrective action comprises issuing an alert or generating an automatic corrective action;
- the data model further comprises a data field that indicates whether an item is one selected from the list consisting of: a private brand, an exclusive brand and an import;
- the user interface permits user editing of the data field that indicates whether factory tracking is required;
- the instructions for identifying duplicate brand entries comprise instructions for identifying spelling or punctuation variations, and wherein the first instructions further comprise logic for: responsive to identifying duplicate brand entries, generating a corrective action;
- the first instructions further comprise logic for initiating a payment based on the data in the hierarchical structure;
- the second information comprises a secondary brand or a license; and
- the first instructions further comprise logic for generating reports on brand performance.

The examples illustrated and described herein as well as examples not specifically described herein but within the scope of aspects of the disclosure constitute an exemplary entity-specific value optimization environment. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for brand and license hierarchy management implemented on at least one processor, the system comprising:
    a processor;
    a data model that constructs a hierarchical structure that stores brand management data received via a first user interface (UI) and license management data received via a second UI, the brand management data including primary brand information and secondary brand information and the license management data including license information, wherein the hierarchical structure includes data fields that indicate:
        a primary brand associated with the primary brand information,
        a secondary brand, nested under the primary brand in the hierarchical structure, associated with the secondary brand information,
        a primary license associated with the license information,
        factory of origin information; and
        an intellectual property (IP) entity associated with at least one of the primary brand, the secondary brand, the primary license, and the factory of origin information, and
    a sensor configured to capture an image of an item for sale;
    a computer vision component, implemented on the processor, configured to extract image entities of the item for sale from the captured image;
    a machine learning component, implemented on the processor, that maps the extracted image entities of the item for sale to the IP entity associated with the primary brand information and the secondary brand information stored in the hierarchical structure,
    wherein the processor:
        conducts an item data audit that identifies duplicate brand entries based on spelling or punctuation variations of the brand;
        responsive to identifying the duplicate brand entries, automatically merges the duplicate brand entries into a single brand entry by merging respective data of each of the duplicate brand entries into the single brand entry; and
        automatically executes an instruction to execute a royalty payment to the IP entity based on one or more of the factory of origin information, the primary brand information, the secondary brand information, and the license information included in the hierarchical structure.

2. The system of claim 1 wherein the processor further:
    determines whether factory tracking is required;
    responsive to determining that the factory tracking is required, determines whether factory tracking data is provided, the factory tracking data including a factory of origin for the item for sale; and
    responsive to determining that the factory tracking is not provided, generates a corrective action, where the corrective action comprises issuing an alert.

3. The system of claim 1 wherein the data model further comprises a data field that indicates whether an item is one selected from a list comprising:
    a private brand, an exclusive brand, and an import.

4. The system of claim 1 wherein the single brand entry includes the brand information without the spelling or punctuation variations of the brand.

5. The system of claim 4 wherein identifying duplicate brand entries comprise identifying spelling or punctuation variations, and
    wherein automatically merging the duplicate brand entries into the single brand entry is a corrective action.

6. The system of claim 1 wherein the processor further sets factory tracking data based at least in part on at least one of regulatory requirements, ethical sourcing (ES) information, or whether the item for sale is a private brand.

7. The system of claim 1 wherein the processor further generates reports on brand performance.

8. A method for brand and license hierarchy management implemented on at least one processor, the method comprising:
    constructing a hierarchical structure that stores brand management data received via a first user interface (UI) and license management data received via a second UI, the brand management data including primary brand information and secondary brand information and the license management data including license information, wherein the hierarchical structure includes data fields that indicate:
        a primary brand associated with the primary brand information,
        a secondary brand, nested under the primary brand in the hierarchical structure, associated with the secondary brand information,
        a primary license associated with the license information,
        factory of origin information; and
        an intellectual property (IP) entity associated with at least one of the primary brand, the secondary brand, the primary license, and the factory of origin information, and
    capturing, via a sensor, an image of an item for sale;
    extracting, via a computer vision component, image entities of the item for sale from the captured image;
    mapping, by a machine learning component, the extracted image entities of the item for sale to the IP entity associated with the primary brand information and the secondary brand information stored in the hierarchical structure;
    conducting an item data audit that identifies duplicate brand entries based on spelling or punctuation variations of the brand;
    responsive to identifying the duplicate brand entries, automatically merging the duplicate brand entries into a single brand entry by merging respective data of each of the duplicate brand entries into the single brand entry; and automatically executing an instruction to execute a royalty payment to the IP entity based on one or more of the factory of origin information, the primary brand information, the secondary brand information, and the license information included in the hierarchical structure.

9. The method of claim 8 wherein automatically merging the duplicate brand entries into the single brand entry is a corrective action.

10. The method of claim 9 wherein the corrective action further comprises an alert.

11. The method of claim 8 wherein the data model further comprises a data field that indicates whether an item is one selected from a list comprising:

a private brand, an exclusive brand, and an import.

12. The method of claim 8 further comprising associating a second information with the item for sale, the associating comprising associating a secondary brand with the item.

13. The method of claim 8 further comprising associating a second information with the item for sale, the associating comprising associating a license with the item.

14. The method of claim 8 wherein the single brand entry includes the brand information without the spelling or punctuation variations of the brand.

15. One or more non-transitory computer storage devices having computer-executable instructions stored thereon for brand and license hierarchy management, which, on execution by a computer, cause the computer to perform operations comprising:

constructing a hierarchical structure that stores brand management data received via a first user interface (UI) and license management data received via a second UI, the brand management data including primary brand information and secondary brand information and the license management data including license information, wherein the hierarchical structure includes data fields that indicate:

a primary brand associated with the primary brand information, a secondary brand, nested under the primary brand in the hierarchical structure, associated with the secondary brand information, a primary license associated with the license information, factory of origin information; and an intellectual property (IP) entity associated with at least one of the primary brand, the secondary brand, the primary license, and the factory of origin information, and receiving, from a sensor, an image of an item for sale;

extracting, by a computer vision component, image entities of the item for sale from the received image of the item for sale;

mapping, by a machine learning component, the extracted image entities of the item for sale to the IP entity associated with the primary brand information and the secondary brand information stored in the hierarchical structure;

conducting an item data audit that identifies duplicate brand entries based on spelling or punctuation variations of the brand;

responsive to identifying the duplicate brand entries, automatically merging the duplicate brand entries into a single brand entry by merging respective data of each of the duplicate brand entries into the single brand entry; and automatically executing an instruction to execute a royalty payment to the IP entity based on one or more of the factory of origin information, the primary brand information, the secondary brand information, and the primary information included in the hierarchical structure.

16. The one or more non-transitory computer storage devices of claim 15 further having computer-executable instructions for issuing an alert.

17. The one or more non-transitory computer storage devices of claim 15 wherein automatically merging the duplicate brand entries into the single brand entry is a corrective action.

18. The one or more non-transitory computer storage devices of claim 15 wherein the data model further comprises a data field that indicates whether an item is one selected from a list consisting of:

a private brand, an exclusive brand, and an import.

19. The one or more non-transitory computer storage devices of claim 15 further having computer-executable instructions for associating a second information with the item for sale, the associating comprising associating the secondary brand with the item.

20. The one or more non-transitory computer storage devices of claim 19 further having computer-executable instructions for associating a second information with the item, the associating comprising associating the license with the item.

* * * * *